United States Patent [19] — [11] 4,249,785

Hapgood et al. — [45] Feb. 10, 1981

[54] LABORATORY BENCH FOR HANDICAPPED STUDENTS

[75] Inventors: William W. Hapgood, Sacramento; Wasyl Krimetz, Davis, both of Calif.

[73] Assignee: The Regents of the University of California, Berkeley, Calif.

[21] Appl. No.: 13,202

[22] Filed: Feb. 21, 1979

[51] Int. Cl.[3] ...................... A61C 19/02; A47B 77/08

[52] U.S. Cl. .................................... 312/196; 312/209; 312/228

[58] Field of Search ............... 312/194, 196, 209, 228, 312/229, 278

[56] References Cited

U.S. PATENT DOCUMENTS

| | | | |
|---|---|---|---|
| 1,567,618 | 12/1925 | Robinson | 312/194 |
| 3,240,171 | 3/1966 | Hatch | 312/228 |
| 3,316,043 | 4/1967 | Taskey | 312/194 |
| 3,565,501 | 2/1971 | Bowen et al. | 312/228 |
| 4,040,692 | 8/1977 | Sass et al. | 312/194 |
| 4,053,193 | 10/1977 | Grover et al. | 312/228 |

*Primary Examiner*—Casmir A. Nunberg
*Attorney, Agent, or Firm*—Lothrop & West

[57] ABSTRACT

A laboratory bench for handicapped students, especially those occupying wheelchairs, includes a rectangular framework supported by rollers on the floor. The framework is covered with a top disposed above the floor high enough to be well above a wheelchair in part entering a chair opening defined between a couple of pedestals on the framework below the top. Situated in one of the pedestals is a sink disposed below an opening through the top, and situated in the pedestal below the sink is a waste tank. On the framework above the other pedestal and above the top is a draft hood situated on a bias to open toward the sink and toward a user occupying a chair in the chair opening. A draft exhaust system for the draft hood has a flexible discharge duct above the draft hood. Flexible hoses, wires and the like with appropriate connectors are secured to items on the bench and can connect to related devices in the surroundings. There are, in addition, drawers in the other pedestal arranged so that they cannot be pulled entirely out. Preferably there is a rack frame across the rear of the top of the bench to receive various chemical piping and the like.

5 Claims, 4 Drawing Figures

LABORATORY BENCH FOR HANDICAPPED STUDENTS

BRIEF SUMMARY OF THE INVENTION

A laboratory bench especially for chemical work is arranged so that it will receive a wheelchair in which the user sits. The bench has a sink and drain facility available through an opening in the top of the bench and also has various drawers and fittings for chemical and related equipment. There is a framework or rack across the rear of the bench so that the necessary tubing and equipment setups can be accomplished. Above a pedestal portion of the bench and above the top is disposed a vent hood having an opening facing generally toward the sink and toward the occupant of a wheelchair in the bench opening. The hood is provided with a vent fan or fans effective to take fumes from the hood and to discharge them, preferably through a flexible connection, to a suitable receptor available near the point of use. The bench is on casters and can readily be moved about from place to place not only to accommodate the prospective user, but likewise to have appropriate relationship to various fixed outlets such as gas cocks, water cocks and the like in the vicinity.

DETAILED DESCRIPTION

Figure 2:
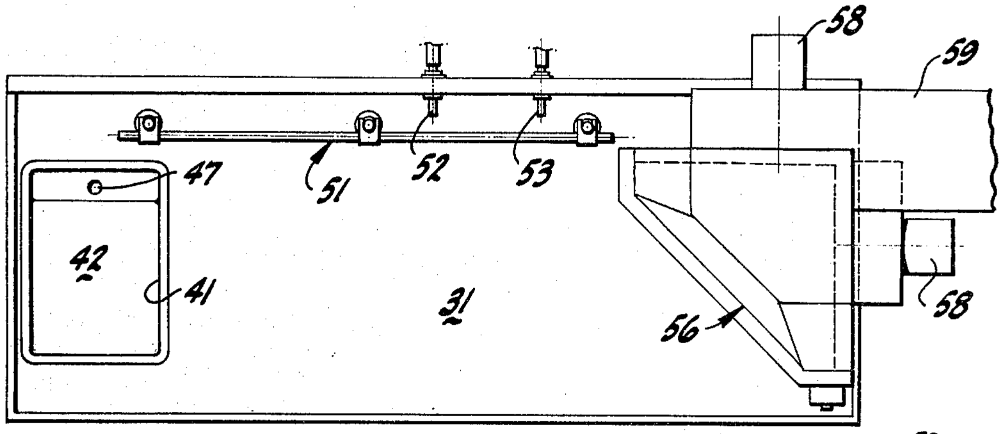
FIG. 2 is a plan of the structure shown in FIG. 1.
Figure 1:
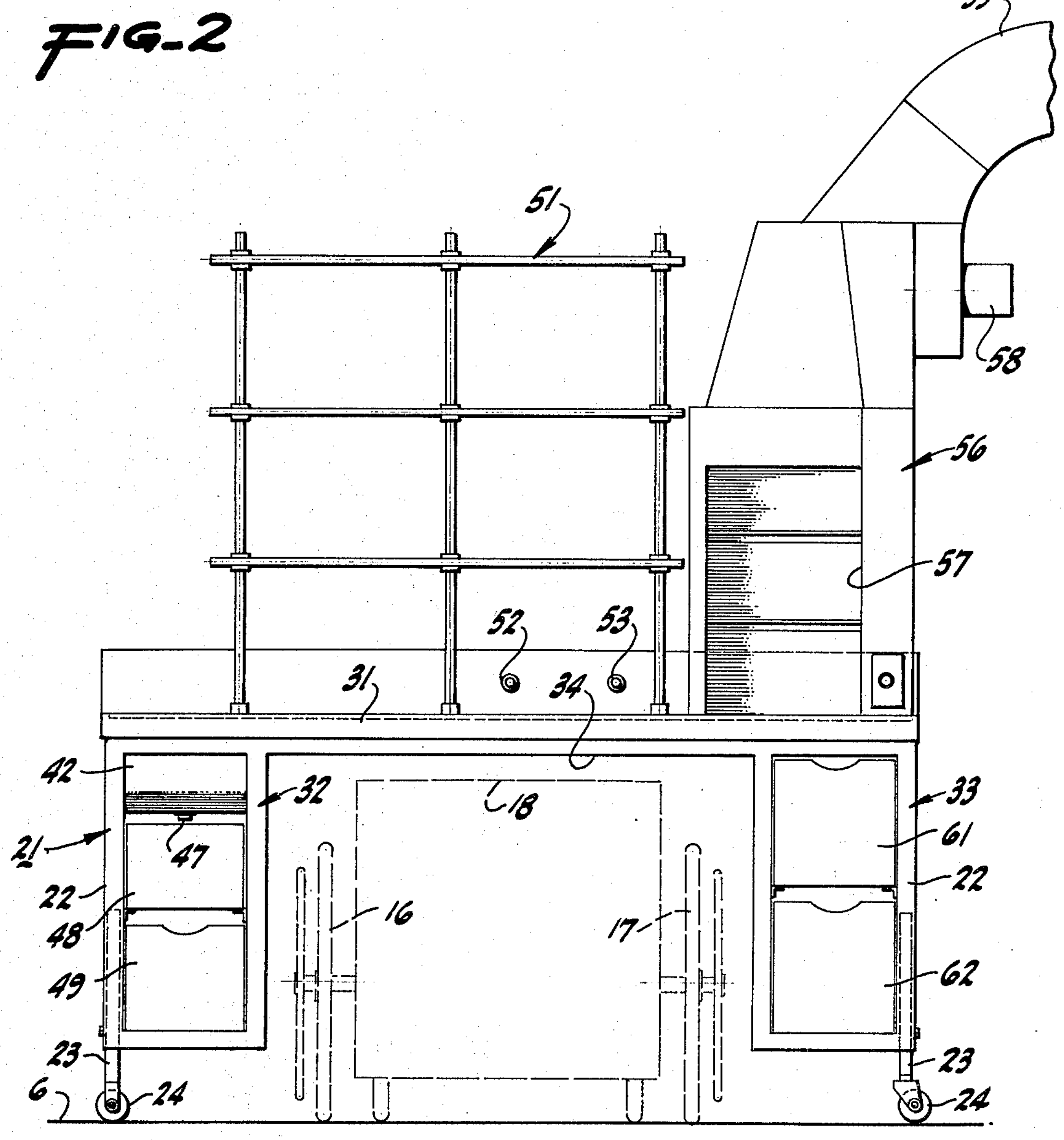
FIG. 1 is a front elevation of a laboratory bench pursuant to the accompanying disclosure, some of the connections not being shown in detail.
Figure 3:
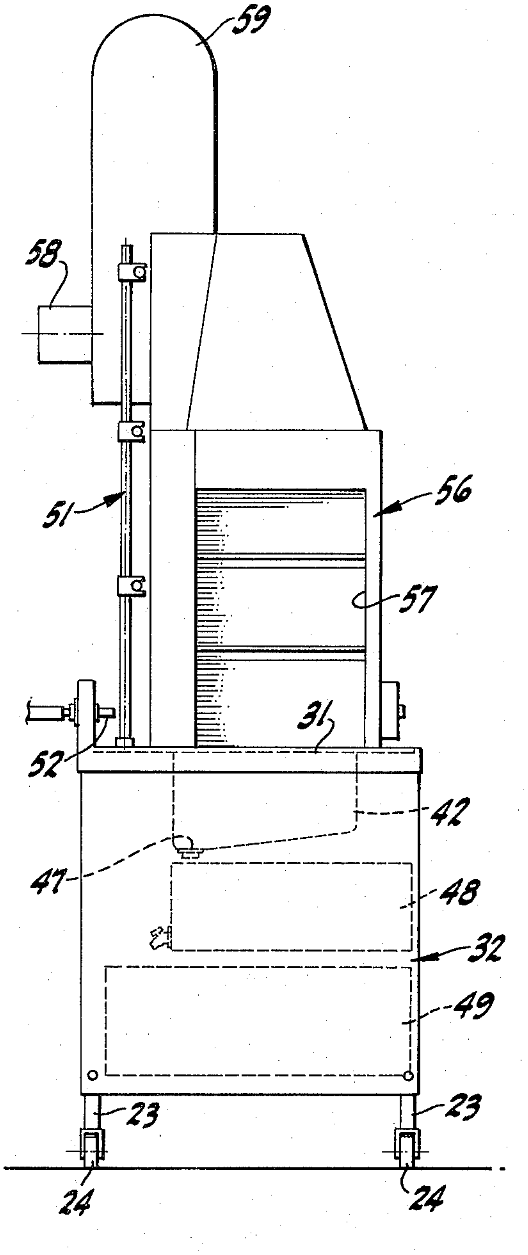
FIG. 3 is a side elevation from the left of the device of FIG. 1.
Figure 4:
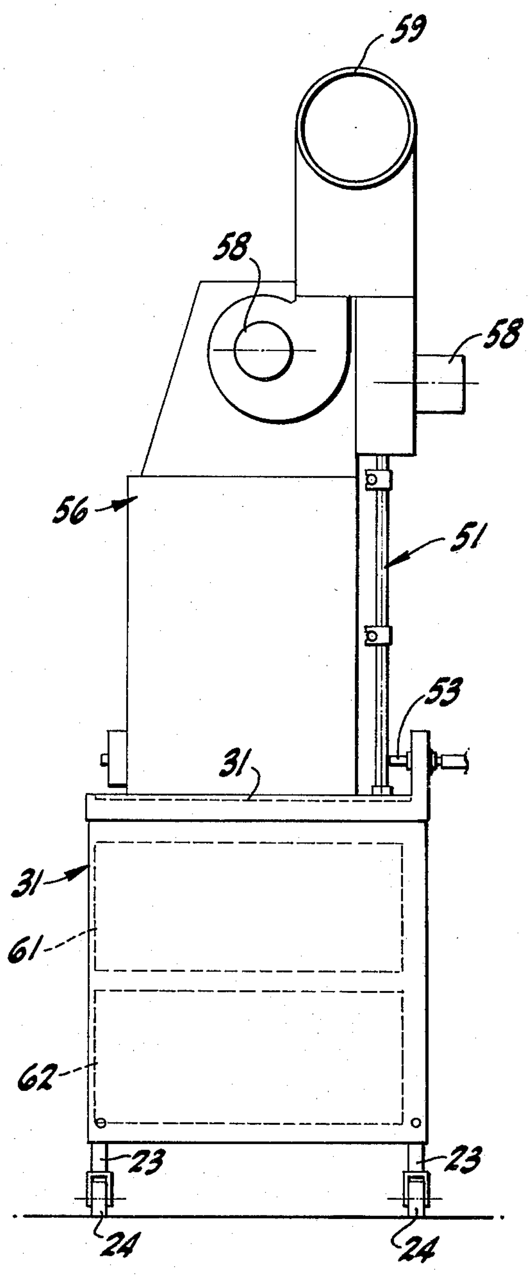
FIG. 4 is a side elevation from the right of the mechanism of FIG. 1.

The device is intended for use in a laboratory-style room having a floor 6 and having various pieces of equipment, such as auxiliary sources of electricity, gas, compressed air and the like, available in the vicinity as well as having an exhaust hood or outlet structure likewise readily available. The device is especially for use by a person occupying a wheelchair having side wheels 16 and 17 designed to run on the floor 6 having a construction which extends to boundaries, such as 18.

The bench is equipped with a framework 21 preferably of metal shapes inclusive of corner legs 22 having telescoped supports 23 therein adjustable in height and fixable at any select elevation. The lower portions of the supports preferably have casters 24, so that the entire structure can be wheeled about. In order to accommodate the wheelchair, the framework 21 has an edge-lipped top 31 of planar extent and rectangular in plan resting on a pair of pedestals 32 and 33, one at each side. The pedestals extend from a convenient point a little above the floor to the top 31, thus largely defining the sides of a central opening 34 easily but snugly receiving the wheelchair. It is immaterial whether the wheelchair is hand-propelled or power-propelled since the dimensions of most chairs normally utilized can fit into the space available.

As part of the chemical laboratory facilities, the top 31 is provided with an opening 41 defining the extent of an appropriate sink 42 having a rectangular opening 46 cut through the top 31. The sink depends into the pedestal 32 and at its lower, rear portion has a drain opening 47 immediately above a waste receptacle 48 or tank in the pedestal just below the sink. The pedestal 32 also preferably houses a sliding drawer 49, especially for reagents, and preferably provided with a latch stop against accidental removal. Liquids and waste materials which are introduced into the upper sink can be flushed and drained therefrom through the opening into the lower receptacle 48. The lower tank is fixed or can be mounted as a drawer and so, when full, withdrawn by an attendant, discharged elsewhere, and easily replaced. A latch stop can be provided to inhibit accidental tank withdrawal. A door panel (not shown) may be provided at the front of the pedestal 32 for protection and appearance.

Upstanding from the top of the bench is a framework 51 of the customary kind for receiving chemical piping, fixtures and the like. These can be arranged to discharge, if desired, into the sink 42. The framework is within reach of an occupant of a wheelchair beneath the top and between the two pedestals. There are backboard fixtures 52 and 53 through the rear, high rim for the attachment of hoses and the like for gas, compressed air and comparable items, the fixtures 52 and 53 being supplied from the other side by flexible hoses going to sources of supply already available in the laboratory. Similarly, electrical outlet stripping (not shown) can be mounted on the backboard.

In order that work within a hood can be taught and accomplished with this structure, the top of the bench is provided with a hood enclosure 56 upstanding above part of the second pedestal 33. The hood is preferably oriented or turned so that the hood opening 57 faces partially toward the sink 42 and partially toward the occupant of the wheelchair. The front of the hood is covered in the usual way by movable doors or the like, and the hood structure is provided with one or more fans 58 driven electrically through a connecting cord and effective to discharge the interior hood fumes to an outlet 59 of a flexible nature. This can readily be disposed beneath a vent already installed in the laboratory or can be connected by an additional flexible duct to discharge into such a vent.

The pedestal 33 is occupied by a couple of drawers 61 and 62 for storage of various items, the drawers being readily accessible to an occupant of the wheelchair but likewise having stops, as does the drawer 49, so that they cannot be pulled out of the framework inadvertently, but can be released for complete removal. A door panel, not shown, may overlie the front of the pedestal 33.

It has been found that a laboratory bench of this sort can be set up or installed virtually anywhere the necessary adjuncts are available. It can be easily positioned with respect to surrounding equipment, furniture, access openings and the like so that the user can readily get to his place of work and can readily fit his wheelchair into the opening. Once there, he finds within arm reach virtually everything he needs for the type of chemical experimentation or work that he is intended to do and can utilize the equipment very much in the way regular laboratory equipment is utilized except that his various equipment is available to him within arm's reach and at a convenient height and depth. The rimmed top channels any spills to the sink and drain tank so that the work may be done safely.

After a period of use of the equipment by one student, the drawers can be changed to afford different reagents for separate experiments or for different students. Likewise the tank 48 can be drained, so that a separate student can have a clean, direct start despite previous use of the structure. Finally, it has been arranged that virtually any form of wheelchair can be readily brought into effective position in the wheelchair opening between the pedestals and beneath the top so that the chair occupant has virtually the same utilization of laboratory equipment as does a non-handicapped individual.

We claim:

1. A laboratory bench for the handicapped comprising a framework including a pair of end pedestals separated in an amount to lie on opposite sides of a wheelchair disposed therebetween, a top extending across the top of said pedestals, vertically variable supports spacing said framework selected distances from the floor to locate said top above said wheelchair so disposed, a sink disposed in one of said pedestals and open through said top, a hood enclosure disposed on said top over the other of said pedestals and having an opening directed toward an occupant of said wheelchair and toward said sink, a fume outlet connected to and extending from said hood enclosure, and a fan connected to said hood enclosure.

2. A device as in claim 1 including a high rim facing an occupant of a wheelchair so disposed and extending along the rear margin of said top and projecting above said top.

3. A device as in claim 2 including supply connecting fixtures extending through said rim within reach of an occupant of said wheelchair so disposed.

4. A device as in claim 1 including a waste receptacle in said one of said pedestals below said sink.

5. A device as in claim 1 including a framework supported on said top and extending above said top to support laboratory equipment within reach of an occupant of said wheelchair so disposed.

* * * * *